United States Patent [19]

Chen

[11] Patent Number: 4,513,776
[45] Date of Patent: Apr. 30, 1985

[54] AUTOMATIC GAS SHUTOFF VALVE

[75] Inventor: Keith A. Chen, Milwaukee, Wis.

[73] Assignee: Wisconsin Gas Company, Milwaukee, Wis.

[21] Appl. No.: 152,356

[22] Filed: May 22, 1980

Related U.S. Application Data

[63] Continuation of Ser. No. 875,322, Feb. 6, 1978, abandoned.

[51] Int. Cl.³ ............................................. F16K 31/12
[52] U.S. Cl. .................................... 137/498; 137/460; 137/519.5
[58] Field of Search ...................... 137/460, 498, 519.5

[56] References Cited

U.S. PATENT DOCUMENTS

| 749,810 | 1/1904 | Truman | 137/519.5 |
| 2,140,027 | 12/1938 | Myllyniemi | 137/498 X |
| 2,475,585 | 7/1949 | Baird | 137/498 |
| 3,575,204 | 4/1971 | McMurry | 137/498 |

FOREIGN PATENT DOCUMENTS 635751 4/1950 United Kingdom ................ 137/498

Primary Examiner—Harold W. Weakley

[57] ABSTRACT

A shutoff valve for installation in a gas distribution line to interrupt the flow of gas automatically upon a drop in pressure in the line due to a break or the like. The valve includes a movable valve member actuated by a piston which is disposed in a cylinder in communication with the distribution line. The top of the piston includes a calibrated aperture which admits gas into the cylinder beneath the piston so that the pressure beneath the piston in the cylinder is substantially equal to the pressure in the line. However, upon a sudden drop in pressure in the line due to a break or the like, the flow of gas through the aperture is metered so that the pressure in the cylinder beneath the piston becomes greater than the pressure in the distribution line, causing the piston to shift upwardly and move the valve member into a position where it interrupts the flow of gas. The pressure differential on the valve member retains it in the closing position. However, upon an equalization of pressure on both sides of the valve member in the line, the valve member drops by gravity out of the closing position and back into the cylinder to permit normal flow of gas through the line.

4 Claims, 2 Drawing Figures

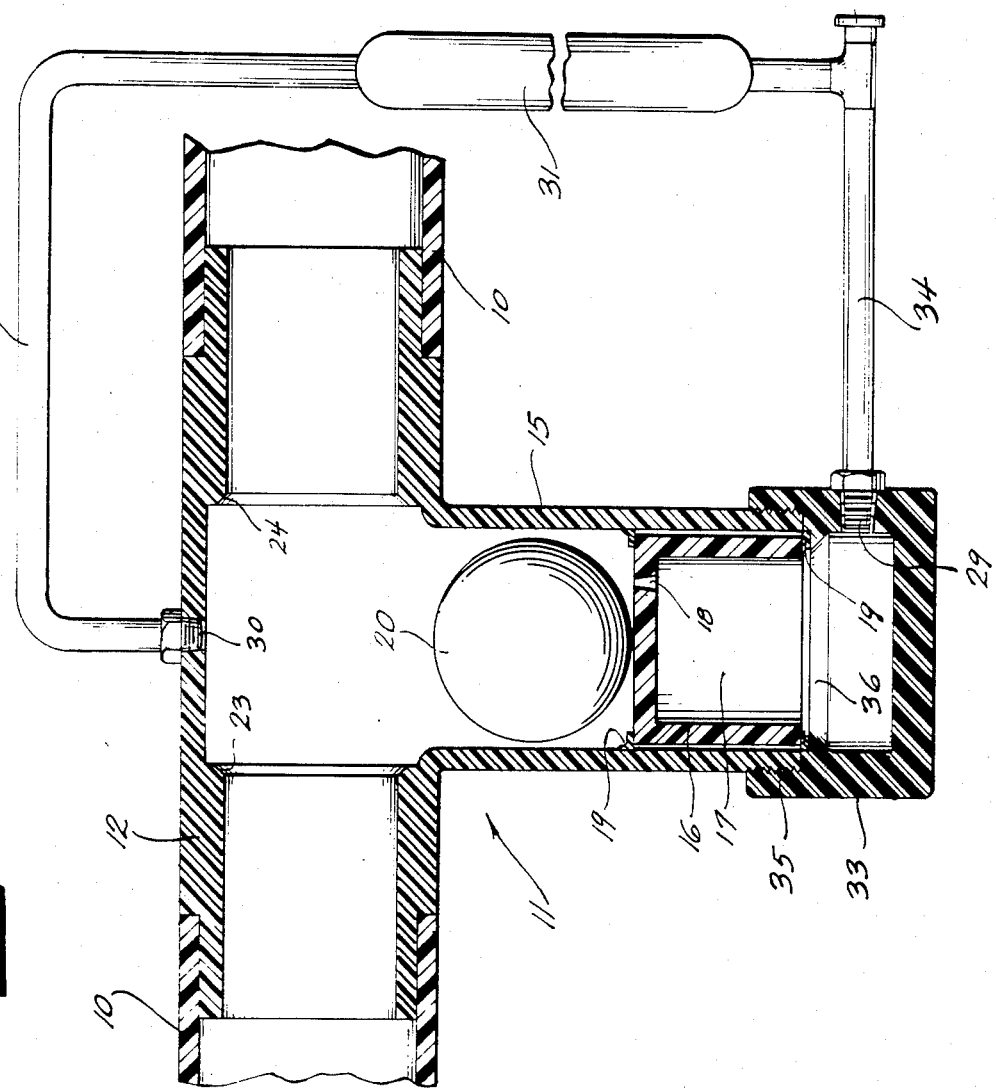

AUTOMATIC GAS SHUTOFF VALVE

This application is a continuation of my co-pending patent application Ser. No. 875,322, filed Feb. 6, 1978, now abandoned.

BACKGROUND OF THE INVENTION

In the distribution of gas, particularly gas that is used for fuel, an accidental break in the distribution line may have serious consequences if the flow of gas cannot be immediately interrupted. Such lines are usually buried in the ground and are not readily accessible for repair and maintenance purposes. It is therefore imperative to provide means for promptly interrupting the flow of gas in the line when a break occurs to prevent the escape of the gas and thereby avoid serious danger. Various types of valves have been provided for this purpose.

For example, U.S. Pat. No. 3,476,133 to Stedfield discloses a valve that operates automatically in response to a drastic change in pressure to interrupt the flow of gas in a distribution line. However, the valve is held in the open position by a shear pin or a shear disc which are sheared by a combination of the change in pressure plus the pressure applied by a spring. If, for any reason the shear pin or shear disc fail to shear as calculated, the valve will not function. Any change in the designed pressure by the spring may likewise cause a malfunctioning of the valve. Moreover, once the valve has been actuated it must be disassembled to restore it to the original position.

In like manner, U.S. Pat. No. 2,942,618 to Hodges provides an automatic valve for interrupting the flow of gas in a distribution line upon the occurrence of a drastic change in pressure in either direction. However, the structure depends upon a magnetic field to retain the valve in the open position. A change in the magnetic forces could cause the valve to malfunction. Moreover, the valve depends on a spring to respond to the change in pressure in the line. Any change in the physical properties of the spring could likewise result in the failure of the valve to operate properly. A further disadvantage lies in the fact that the valve must be manually reset which could present a problem if it were buried in the ground.

Finally, U.S. Pat. No. 2,785,698 to Vance discloses another construction in which the valve includes a diaphragm and a spring that respond to a change in pressure to actuate the valve. Any changes or miscalculation of the physical properties of the spring and diaphragm could cause a malfunctioning of the valve. Moreover, the open position is confined to a very narrow pressure range as determined by the spring weight and the diaphragm area. Also the Vance valve is not bidirectional.

Such reliance on physical structures as shear pins, shear discs, springs, diaphragms, or the like, is entirely eliminated in the present invention. Instead, the size of an aperture and a pressure storage chamber volume are the only major items that need be calculated for proper operation of the valve and, once established, specific behavior patterns may be readily maintained. In addition, the possibility of error in its manufacture is reduced to an absolute minimum and its accuracy of operation readily checked by a simple measurement. A further advantage lies in the fact that the valve requires very little, if any, maintenance and it will reset itself automatically upon the restoration of equal gas pressure on both sides of the valve.

It is accordingly, a general object of the present invention to provide an improved automatic gas shutoff valve that is simple and inexpensive to manufacture but which will operate with improved efficiency and greater reliability than the valves in the prior art.

SUMMARY OF THE INVENTION

The improved automatic gas shutoff valve of the present invention comprises a valve body insertable into a gas distribution line which is to be controlled. A cylinder in communication with the distribution line depends from the valve body and contains a slideable piston. The pressure in the cylinder beneath the piston is normally equalized with that on top of the piston by a suitable aperture in the piston or other means so that the piston remains in its lowermost position in the cylinder. However, if there is a sudden drop in pressure in the line due to a break, or the like, the pressure beneath the piston will exceed that on the top. The pressure differential then causes movement of the piston and ball upwardly into valve closing position so as to interrupt the flow of gas in the line from either direction.

The foregoing and other objects of this invention, which will become more fully apparent from the following detailed description, may be achieved by means of the exemplifying structure depicted in and set forth in this specification in connection with the accompanying drawings.

BRIEF DESCRIPTION OF THE DRAWING

FIG. 1 is a view in vertical section through an automatic shutoff valve constructed in accordance with the present invention and shown installed in a gas distribution line, the valve being depicted in its open condition to allow a free flow of gas through the distribution line;

FIG. 2 is another view in vertical section of the same valve illustrated in FIG. 1 except that the valve elements are shown in position immediately after the valve has been actuated to interrupt the flow of gas in the distribution line and before the piston has dropped to its lower or normal position.

DESCRIPTION OF THE PREFERRED EMBODIMENTS

Reference is now made more particularly to the drawings and specifically to FIG. 1 thereof which illustrates an automatic gas shutoff valve constructed in accordance with the teachings of the present invention. The valve is shown installed in a gas distribution line 10 and is arranged to interrupt the flow of gas through the line 10 in the event that there is a rapid reduction in pressure in the line 10 as would result from a break in the line on either side of the valve. The valve comprises a T-shaped body generally identified by the reference numeral 11 having a cylindrical crossbar 12 and a leg 15 which is likewise a cylindrical shape. The cylindrical leg 15 communicates with the distribution line 10 through the crossbar 12 of the valve body 11.

A piston 16 is slideably contained within the bore of the cylinder 15 for movement toward and away from the crossbar 12. The piston 16 is of hollow construction to provide a cylindrical opening or space 17 with an aperture 18 being formed in the top wall of the piston 16 as clearly shown in FIGS. 1 and 2. A pair of seals 19 are disposed about the upper and lower peripheries of the piston 16 for sealing the piston with the walls of the cylinder 15.

Resting on top of the piston 16 is a spherical valve member 20 which is adapted to engage an annular surface 23 as illustrated in FIG. 2 for interrupting the flow of gas into the distribution line 10 on the left side of the crossbar 12 as viewed in FIGS. 1 and 2. The opposite side of the opening is likewise provided with an annular surface 24 which may be engaged by the valve member 20 for interrupting the flow of gas in the distribution line 10 in the opposite direction.

The valve elements are shown in FIG. 1 in their normal position wherein there is no interference with the flow of gas through the distribution line 10. As the gas begins to flow into the line 10 it seeps about the periphery of the spherical valve member 20 and through the aperture 18 into the cylindrical opening 17, as well as into the rest of space as may be built into the leg 15, and into the pressure storage chambers when one is provided, to equalize the pressure on both sides of the piston 16. Normal fluctuations of pressure in the line 10 will not affect this condition and the elements will remain as shown in FIG. 1. However, in the event that there is a rapid reduction of the pressure in the distribution line 10 as may result from a break in the line, the aperture 18 is calibrated to meter the flow of gas out of the cylinder 17 so that the gas therein will expand to force the piston 16 upwardly to the piston shown in FIG. 2. Such movement of the piston 16 shifts the spherical valve member 20 into the stream of gas in the distribution line 10. Assuming that the break occurred in the line 10 on the left side of the valve as shown in the drawing, the gas flowing from the right side of the distribution line 10 will cause rotation of the spherical valve member 20 to encourage it up further into the gas stream which will force it and hold it against the annular surface 23 to interrupt the flow of gas into the left side of the line. As soon as the spherical member is in closing position and the flow of gas in the pipeline is interrupted, the pressure in the valve body will increase and the piston 16 will drop back to its bottom position. The spherical member remains in the closing position until the pressure in the one side of the line is equalized with that in the other side. If the break occurs on the right side of the valve, pressure from the left side of the valve would force the spherical valve member 20 against the annular surface 24 and prevent the flow of any gas into the line 10 to the right of the valve.

After the pressure in both sides of the line 10 is restored to normal to remove the pressure differential on the two sides of the spherical valve member 20, the force retaining the valve member 20 against the annular surface 23 is removed permitting the valve member to drop by gravity away from the annular surface 23 and onto the top of the piston 16. The pressure from the upper post of valve 11 has likewise flowed through the aperture 18 into the cylindrical opening 17 to equalize the pressure on both sides of the piston 16. The valve is reset and ready to again be actuated as shown in FIG. 1.

The spherical valve member 20 must be formed of a noncompressible material or a material with very limited yield to avoid jamming so that it can readily return by gravity to the top of piston 16 upon restoration of the pressure in the entire distribution line 10. Among the materials suitable for the sphere are a high durometer neoprene, a plastic coated with neoprene, or a hollow steel or aluminum sphere coated with neoprene.

The valve described above with the various mentioned elements will function satisfactorily under normal conditions to shut off the flow of gas in the distribution line 10 upon the occurrence of a drastic drop in pressure. However, in certain situations, a certain amount of liquid may be present in the distribution line 10 due to condensates or for other reasons. Such liquid may seep through the aperture 18 into the cylindrical opening 17 to reduce the storage of the compressible gas in the cylinder 17 or eliminate it entirely. Under such circumstances, the aperture 18 may be replaced by an aperture 30 in the upper wall of the crossbar 12. The aperture 30 is connected to an optional pressure storage chamber 31 by a conduit 32 with the opposite end of the pressure chamber 31 being connected by conduit 34 to cylinder 17 through aperture 29 in bottom cap 33. The lower part of the leg, shown as the cap 33, is connected to the cylinder 15 such as by a threaded coupling 35 which presents an inner annular shoulder 36 that limits the downward movement of the piston 16 to the piston shown in FIG. 1. With this arrangement, the effective volume of gas for actuating the piston 16 includes the content of the cylindrical opening 17 as well as the content of the cylindrical opening within the cap 33.

The line pressure is admitted through the aperture 30 into the conduit 32 which carries it through the optional pressure storage chamber 31. From the pressure chamber 31 the gas flows through the conduit 34 and the aperture 29 to fill the interior of the cap 33 as well as the cylindrical space 17. The aperture 30 is calibrated so that upon a rapid reduction of pressure in the distribution line 10, it would interfere with the flow of gas out of the pressure chamber 31. Therefore the gas flows from the chamber 31 into cap 33 and space 17. The storage chamber 31, increases the effective volume of stored gas in cylinder 17. The retained pressure differential forces the piston 16 upwardly into the piston shown in FIG. 2 and thereby introduces the spherical valve 20 into the stream of gas flowing in the distribution line 10 to interrupt the flow of gas as previously described. In the event that a liquid should seep into the cap 33 or even the cylindrical opening 17 the pressure stored by the chamber 31 would be sufficient to flow through the liquid and force the upward movement of the piston 16 for interrupting the flow of gas.

The conduit 34 is provided with a fitting 38 that may be connected to a pump or other source of compressed air or gas above the ground or at a location remote from the valve so that pressure higher than the pressure in the line 10 can be manually admitted into the interior of the cap 33 and into opening 17 for actuating the piston 16 to the closed position even though the pressure in the line 10 does not drop.

From the foregoing detailed description of the illustrative embodiment of the invention set forth herein it will be apparent that there has been provided an improved automatic gas shutoff valve for interrupting the flow of gas through a distribution line upon the occurrence of a higher than predetermined rate of pressure drop in the line as may be caused by a break on either side of the valve. The valve will operate in either direction automatically in response to a pressure drop rate in the distribution line on either side of the valve to interrupt the flow of gas until the defect can be repaired. The valve operates with a minimum of movable members is an extremely direct manner in response to a change in pressure without other actuating elements such as springs or the like.

Although the illustrative embodiment of the invention has been described in considerable detail for the purpose of disclosing a practical operative arrangement by means of which the invention may be practiced advantageously, it is to be understood that the particular valve structure illustrated and described is intended to be illustrative only and that the various novel characteristics of the invention may be incorporated in other structural forms without departing from the spirit and scope of the invention as defined in the subjoined claims.

The principles of this invention having now been fully explained in connection with the foregoing description, I hereby claim as my invention:

1. An automatic gas shutoff valve for interrupting the flow of gas in a distribution line upon the occurrence of a predetermined rate of drop of pressure in the line; a single cylinder having one end opening into the distribution line for admitting the gas into said cylinder; interrupting means comprising a sphere movably disposed within said cylinder so that a space is formed between said interrupting means and the closed end of said cylinder, said interrupting means being movable out of said cylinder and into said distribution line to interrupt the flow of gas through said distribution line and including an annular surface in said distribution line on each side of said cylinder, said annular surfaces being engageable by said sphere for interrupting the flow of gas in either direction depending upon which side of said cylinder the break in the distribution line occurred and the pressure differential on said sphere will retain it against one of said annular surfaces to prevent the flow of gas from the unbroken sides of the distribution line into the broken side of the distribution line; means admitting the gas from the line into the space at the closed end of said cylinder to equalize the pressure on both sides of said interrupting means, said admitting means restricting the rate of escape of the gas in said space so that when a predetermined rate of pressure reduction is exceeded in the distribution line due to a break in the line, a pressure differential will occur on said interrupting means causing the gas in said space to expand rapidly and shift said interrupting means into the distribution line to interrupt the flow of gas through the line.

2. An automatic gas shutoff valve according to claim 1 wherein said interrupting means includes a piston in said cylinder with said space being disposed between said piston and the closed end of said cylinder and said sphere rests on said cylinder so that when a predetermined rate of pressure reduction is exceeded in said distribution line the expansion of gas in said space will shift said piston to force said sphere into the distribution line for interrupting the flow of gas therethrough.

3. An automatic gas shutoff valve according to claim 2 wherein said admitting means is an aperture in said piston and including sealing means sealing said piston with the walls of said cylinder while permitting the movement of said piston in said cylinder.

4. An automatic gas shutoff valve for interrupting the flow of gas in a distribution line upon the occurrence of a predetermined rate of drop of pressure in the line; a cylinder having one end opening into the distribution line; a piston disposed in said cylinder to form a space between the closed end of said cylinder and the bottom of said piston and said piston is provided with an aperture which admits the line pressure into such space to equalize the pressure on both sides of said piston; means sealing the periphery of said piston with the walls of said cylinder while permitting the movement of said piston in said cylinder; a sphere resting on said piston so that when a predetermined rate of pressure reduction is exceeded in the distribution line the expansion of gas in the space beneath said piston will shift the piston toward the distribution line to force said sphere into the distribution line; and an annular surface in the distribution line on each said of said cylinder for engagement by said sphere to interrupt the flow of gas in either direction depending upon which side of said cylinder the break in the distribution line occurs and the pressure differential on said sphere will retain it against one of said annular surfaces to prevent the flow of gas from the unbroken side of the distribution line into the broken side of the distribution line.

* * * * *